US005580581A

United States Patent [19]

Buehning

[11] Patent Number: 5,580,581

[45] Date of Patent: Dec. 3, 1996

[54] MELTBLOWING DIE WITH REPLACEABLE PRESET DIE TIP ASSEMBLY

[75] Inventor: Peter G. Buehning, Short Hills, N.J.

[73] Assignee: Accurate Products Company, Hillside, N.J.

[21] Appl. No.: 423,689

[22] Filed: Apr. 18, 1995

Related U.S. Application Data

[63] Continuation of Ser. No. 835,190, Feb. 13, 1992, abandoned.

[51] Int. Cl.[6] .............................. B29C 47/12; D01D 5/14

[52] U.S. Cl. .............................. 425/007; 264/12; 264/39; 425/72.2; 425/186; 425/192 S; 425/382.2; 425/464

[58] Field of Search ................................ 425/72.2, 192 S, 425/190, 7, 464, 186, 192 R, 6, 66, 378.2, 382.2; 264/12, 518, 39

[56] References Cited

U.S. PATENT DOCUMENTS

| | | | |
|---|---|---|---|
| 3,354,686 | 11/1967 | Petsch | 425/190 |
| 3,825,380 | 7/1974 | Harding et al. | 425/72.2 |
| 3,865,535 | 2/1975 | Langdon et al. | 425/382.2 |
| 3,891,379 | 6/1975 | Lenk | 425/192 S |
| 3,947,166 | 3/1976 | Kleeman et al. | 425/7 |
| 3,978,185 | 8/1976 | Buntin et al. | 264/518 |
| 4,295,809 | 10/1981 | Mikami et al. | 264/12 |
| 4,318,725 | 3/1982 | Phillips | 425/7 |
| 4,818,463 | 4/1989 | Buehning | 264/40.1 |
| 4,986,743 | 1/1991 | Buehning | 425/464 |
| 5,022,252 | 6/1991 | Wellman et al. | 425/190 |
| 5,080,569 | 1/1992 | Gubernick et al. | 425/72.2 |
| 5,145,689 | 9/1992 | Allen et al. | 425/72.2 |

FOREIGN PATENT DOCUMENTS

| | | | |
|---|---|---|---|
| 54-73916 | 6/1979 | Japan | 264/12 |
| 3-213550 | 9/1991 | Japan | 425/72.2 |
| 3-213549 | 9/1991 | Japan | 425/72.2 |
| 2158005 | 11/1985 | United Kingdom | 425/72.2 |

*Primary Examiner*—Jay H. Woo
*Assistant Examiner*—Joseph Leyson
*Attorney, Agent, or Firm*—Michael de Angeli

[57] ABSTRACT

A meltblowing die designed to efficiently receive a preassembled die tip assembly is described. The die assembly includes a die body mounted on a meltblowing machine and a replaceable die tip assembly. The die tip assembly includes a mounting block, to which are mounted a die tip and air knives on opposite sides of the die tip. The positions of the air knives are adjustable to set air gap and set back parameters important in proper operation. The die tip assembly is moved into and out of the die body after air knife adjustment, permitting the adjustment to be made with the die tip assembly off the machine, and allowing rapid replacement. The replacement die tip assembly is preheated, permitting replacement while the die body is still hot.

12 Claims, 5 Drawing Sheets

MELTBLOWING DIE WITH REPLACEABLE PRESET DIE TIP ASSEMBLY

This application is a continuation of application Ser. No. 07/835,190, filed Feb. 13, 1992, now abandoned.

BACKGROUND OF THE INVENTION

This invention relates generally to meltblowing dies and specifically to a meltblowing die with a replaceable die tip. In another aspect, the invention relates to a method of replacing the die tip of a meltblowing die.

Meltblowing is a process for manufacturing nonwoven products by extruding a molten thermoplastic resin through a plurality of small orifices to form fine fibers while blowing converging sheets of air onto each side of the orifices to attenuate and draw down the fibers. The extruded fibers are blown onto a moving collector surface where they entangle in a random way to produce a nonwoven fabric or web. The newly formed web is directly withdrawn from the collector for winding and the overall process is carried out continuously. The webs may be further processed into a number of commercially important products such as filters, fabrics, and battery separators to name a few. Some meltblowing dies are disclosed in U.S. Pat. Nos. 3,978,185; 4,818,463; and 4,986,743.

A key component of a meltblowing die is the die tip. The die tip is an elongate member having an outwardly protruding nose piece of triangular cross section terminating in an apex with a row of side-by-side orifices drilled through the apex. A polymer melt is forced through the orifices for extruding the polymer and discharged as side-by-side molten or semimolten fibers. The die tip is generally formed of high quality steel in a separate machining process and fastened to the face of the die body using bolts. Precise machining is required to achieve uniform polymer flow over the length of the orifice row. The polymer is forced through the die tip orifices by applying large pressure on the molten polymer inside the tip. The internal pressure induces tensile stress in the die tip which tends to concentrate near the apex of the tip and may cause the tip to fail in tension. U.S. Pat. No. 4,986,743 teaches the use of die tip mounted on the die body with induced compression in the apex region to counterbalance the tensile stress and is incorporated herein by reference.

Other important components of the meltblowing die are elongate plates referred to as air knives which, in combination with the die tip nose piece, form converging air flows to attenuate and draw down the extruded fibers to microsized diameters. The air knives are generally thick elongate plates which have longitudinal edge tapered to form a knife edge. Two air knives are typically used and are fastened to the face of the die body (using bolts) on opposite sides of the triangular die tip nose piece. The tapered edges of the air knives are aligned with the confronting tapered surfaces of the nose piece and spaced slightly therefrom to form two flow channels which converge at the apex of the nose piece. The spatial relationship between the air knives and the die tip is defined in the art by parameters known as air-gap and set-back. The air-gap and set-back determine the geometry of the converging air flow passages, and thereby influence the air flow properties and the degree of fiber-air interaction. Research has shown that controlling the air flow properties in relation to the polymer flow properties is important for achieving the desired degree of fiber attenuation and final fiber diameter. Research has further shown that the fiber diameter strongly influences the properties of She web such as filtration efficiency. In some die designs, the air-gap and set-back are adjustable for achieving the desired air flow properties. Meltblowing polymers with different compositions may require different air-gap and set-back.

A common problem in meltblowing occurs when the die tip plugs or structurally fails requiring that the die tip be removed for cleaning or replacement. In a conventional meltblowing die, the die tip and air knives are separate components which are individually bolted to the face of the die (e.g., those shown in U.S. Pat. Nos. 4,818,463 and 4,986,743). Removal of the die tip generally requires first that each air knife be detached from the die body to gain access to the die tip. Large meltblowing dies are normally vertically oriented and discharge downwardly onto a moving collector surface such as a conveyor screen or rotating drum. For removing each air knife, the air knife bolts are removed, the air knife lowered From the die face and withdrawn from the workspace. The die tip bolts are then removed and the tip is lowered and withdrawn. For large dies this procedure may be hazardous due to the large weight of the air knives and die tip. For dies employing a large conveyor-type collector, it may not be feasible to move either the die or collector to facilitate replacement of a fouled or damaged die tip, and this further complicates the procedure due to the restricted space between the die and collector.

Similar difficulties to those described above are encountered in the reverse installation procedure, where yet another serious problem is the adjustment of the air-gap and set-back after the die tip and air knives have been reattached.

In addition to safety problems, the die tip may be damaged as it is maneuvered into or out of the die. In typical operation, the die tip and air knives may be at temperatures above four hundred degrees Fahrenheit and the meltblowing line must be shut down for an extended period to allow for cooling before repairs can be made or die tip replacement effected.

SUMMARY OF THE INVENTION

The meltblowing die constructed according to the present invention simplifies the removal and installation of the meltblowing die tip and circumvents many of the difficulties noted above for conventional dies. The invention involves the use of a meltblowing die body designed to efficiently receive a preassembled die tip assembly. Although the invention may be applied to any size die, it is expected to be of excellent utility for larger dies (e.g., those of fifty inches or longer).

The die tip assembly of the present invention comprises the meltblowing components of the die tip and the air knives mounted on a mounting block, preferably in the form of a U-shaped member. The die body is provided with an open ended elongate cavity for slidingly receiving the preassembled die tip assembly. The die tip assembly slides into the end of the cavity from the side of the die body and is guided into position along longitudinal intermeshing shoulders (e.g., rails or ribs) formed along the cavity walls. In vertically oriented dies, the longitudinal intermeshing shoulders support the weight of the assembly as it slides lengthwise within the cavity into position.

The die tip assembly is secured to the die body by applied forces which act to compress the back side of the assembly against the confronting back wall of the die body cavity. The forces may be applied to the mounting block of the assembly using bolts or, alternatively, hydraulically activated pistons.

The securing forces may be removed without danger since the weight of the die tip assembly is supported entirely by the ribs of the die cavity.

The present die tip assembly has an elongate internal flow passage for receiving molten polymer from the die body and conducting the polymer to the die tip orifices. The assembly also has flanking air flow passages for receiving air from the die body and discharging converging sheets of air onto opposite sides of the die tip orifices. The die tip assembly is in fluid communication with the die body through inlets formed in the back side of the assembly. The confronting surfaces of the die tip and cavity wall are machined planar surfaces which when interfaced in tight compression form metal-on-metal fluid seals at the junctions of the assembly inlets and the die body outlets. The compressive forces acting on the die tip assembly thus serve to secure the assembly to the die body and to form a fluid seal between the assembly and the body.

In the die tip assembly of the present invention, the die tip and the air knives are preassembled into the respective operating positions on the mounting block before the assembly is installed in the die body. During the preassembly, a novel feature of the present invention provides for presetting of the air-gap and set-back to predetermined values with no further adjustments required for operation. The die tip assembly components will generally be preassembled on a planar work surface and then transported to the die using a cart or crane. The die tip assembly will be aligned with the die body cavity and slid into the die body cavity. In one embodiment of the invention, the replacement die assembly can be used to push an existing assembly through the opposite open end of the die body cavity for removal. An existing assembly may also be withdrawn using a winch or ram directly.

In accordance with the method of the present invention, the die tip assembly may be preheated to or near the meltblowing temperature for direct insertion into a hot die. The preheating is needed to induce thermal expansion in the die tip assembly approximately equal to that in the die body so that the registering flow passages and other mating surfaces of the die tip assembly and the die body align properly and also to prevent thermal stress and buckling or warping of the die which might occur if a long cold assembly is inserted into a heated die body.

For efficiently transporting, preheating, installing and removing the assembly, a specifically designed cart is anticipated. The cart may be equipped with a furnace enclosure for preheating the assembly, a means for aligning the assembly with the die body cavity for installation, and a means for forcing the assembly into or out of the die body. The cart may also include an assembly support surface comprising roller means for easily delivering and receiving the assembly.

An important aspect of the present invention is that for replacing a fouled, worn or damaged die tip, the present assembly design simplifies the replacement procedure to the point where a hot die tip assembly may be removed and a preheated replacement die tip assembly installed safely, thereby avoiding the cooling period required before repairing a conventional die. The die tip assembly can be preassembled thereby permitting accurate adjustment and checking of the air gap and set back prior to installation.

The present invention will reduce the time required to replace a die tip as well as decrease both the probability of personal injury and the probability of damaging the die tip during installation or removal. It can be appreciated that the die tip assembly is secured to the die body using quick release fasteners (including hydraulically activated pistons). For replacing a fouled or damaged die tip, the line is momentarily shut down and the fasteners deactivated freeing the old die tip assembly, a new preheated assembly is slidingly moved into the die and displaces the old assembly for removal, the fasteners are reactivated to secure the new assembly for operation and the line restarted.

Other die tip assembly designs can be envisioned without departing from the inventive concept as described and claimed herein. The advantage of the present invention lies in a meltblowing die designed to efficiently receive a preassembled die tip assembly wherein the meltblowing die tip and the air knives are configured in the respective operating positions.

DESCRIPTION OF THE PREFERRED EMBODIMENTS

Figure 1:
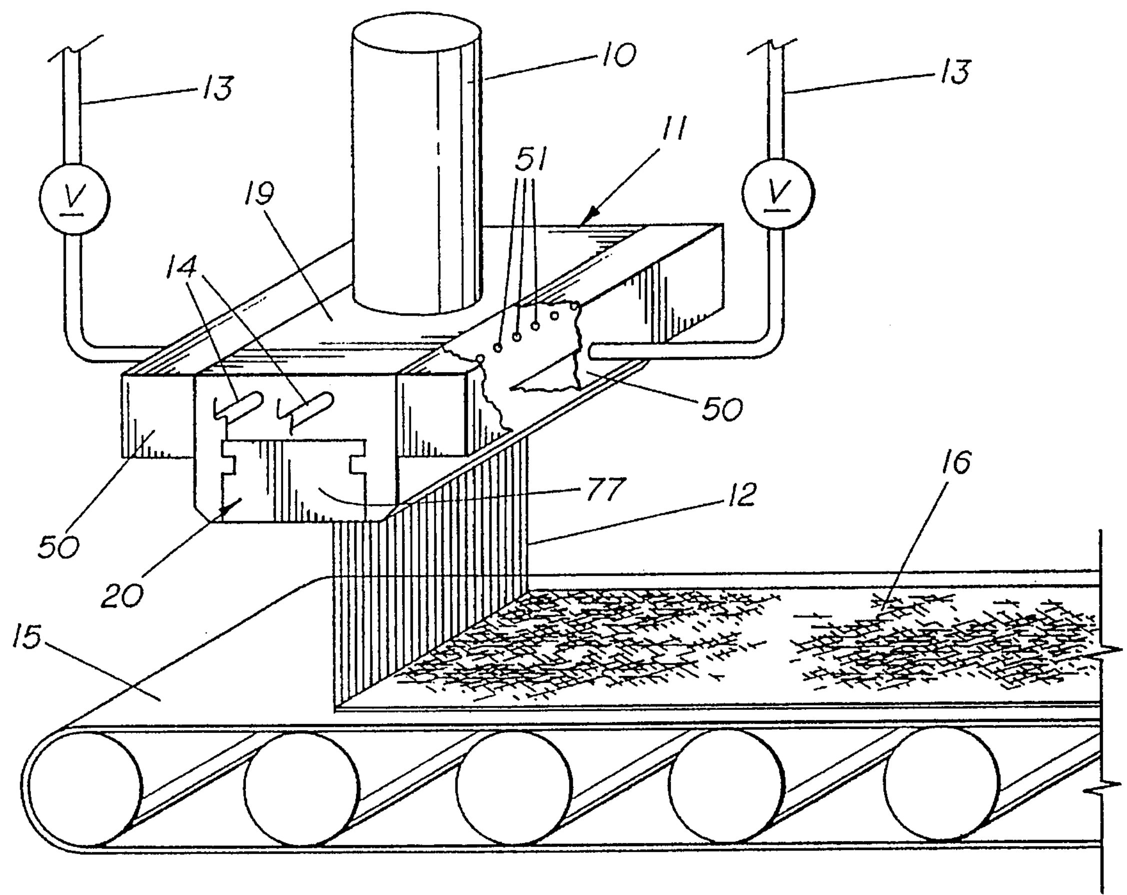
FIG. 1 is a schematic illustrating the main components of a meltblowing line, including the meltblowing die assembly constructed according to the present invention.

As shown in FIG. 1, the main components of a meltblowing line comprises an extruder 10, meltblowing die 11, and a revolving collection screen 15. The extruder 10 supplies molten polymer to die 11 which discharges a plurality of side-by-side molten or semimolten fibers into converging air sheets to drawdown and attenuate the fibers and to form a fiber-air stream 12. The air is supplied through valved lines 13, and heating elements 14 are provided in the die 11 for heating the polymer. The fiber air stream 12 flows downwardly onto the moving collector screen 15 where the fibers entangle and deposit to form a nonwoven web 16. The meltblowing die 11 constructed according to the present invention includes a die body 19 and a replaceable die tip assembly 20. The assembly 11 is illustrated and described herein as having a vertical orientation wherein the fibers are discharged downwardly onto an underlying collector 15. It is to be understood, however, that use of the terms "vertical", "downwardly", "upwardly", and the like herein and in the claims are merely for reference, and are not to be construed as limiting terms. The die assembly 11 can have horizontal or intermediate orientations as well.

Figure 2:
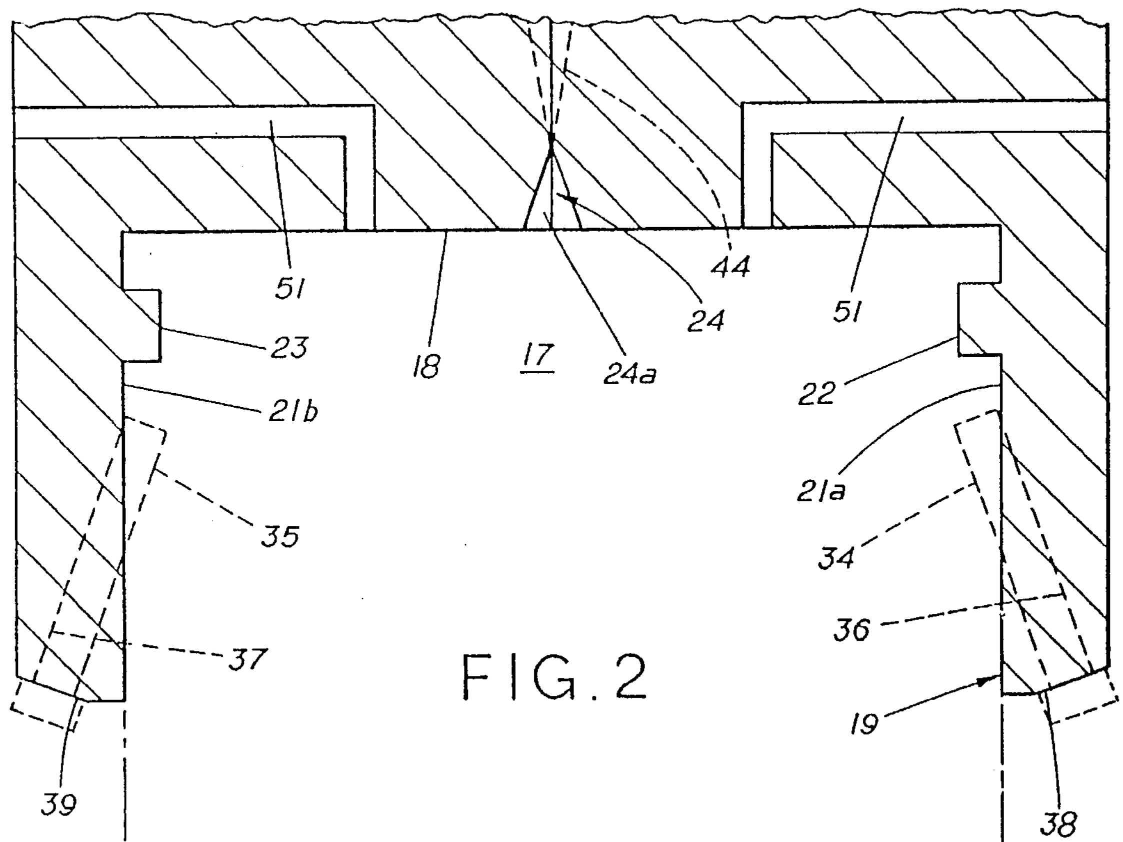
FIG. 2 is a cross-sectional view illustrating details of the die body of the die assembly.
Figure 3:
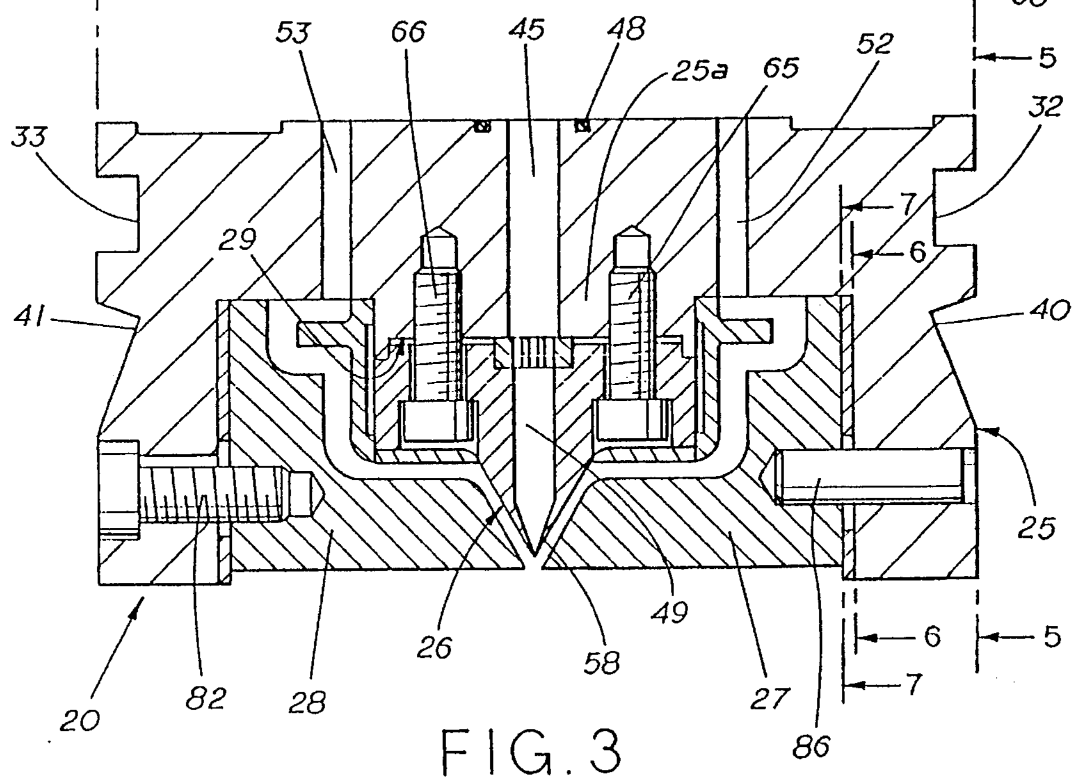
FIG. 3 is a cross-sectional view illustrating details of the die tip assembly of the die assembly.
Figure 4:
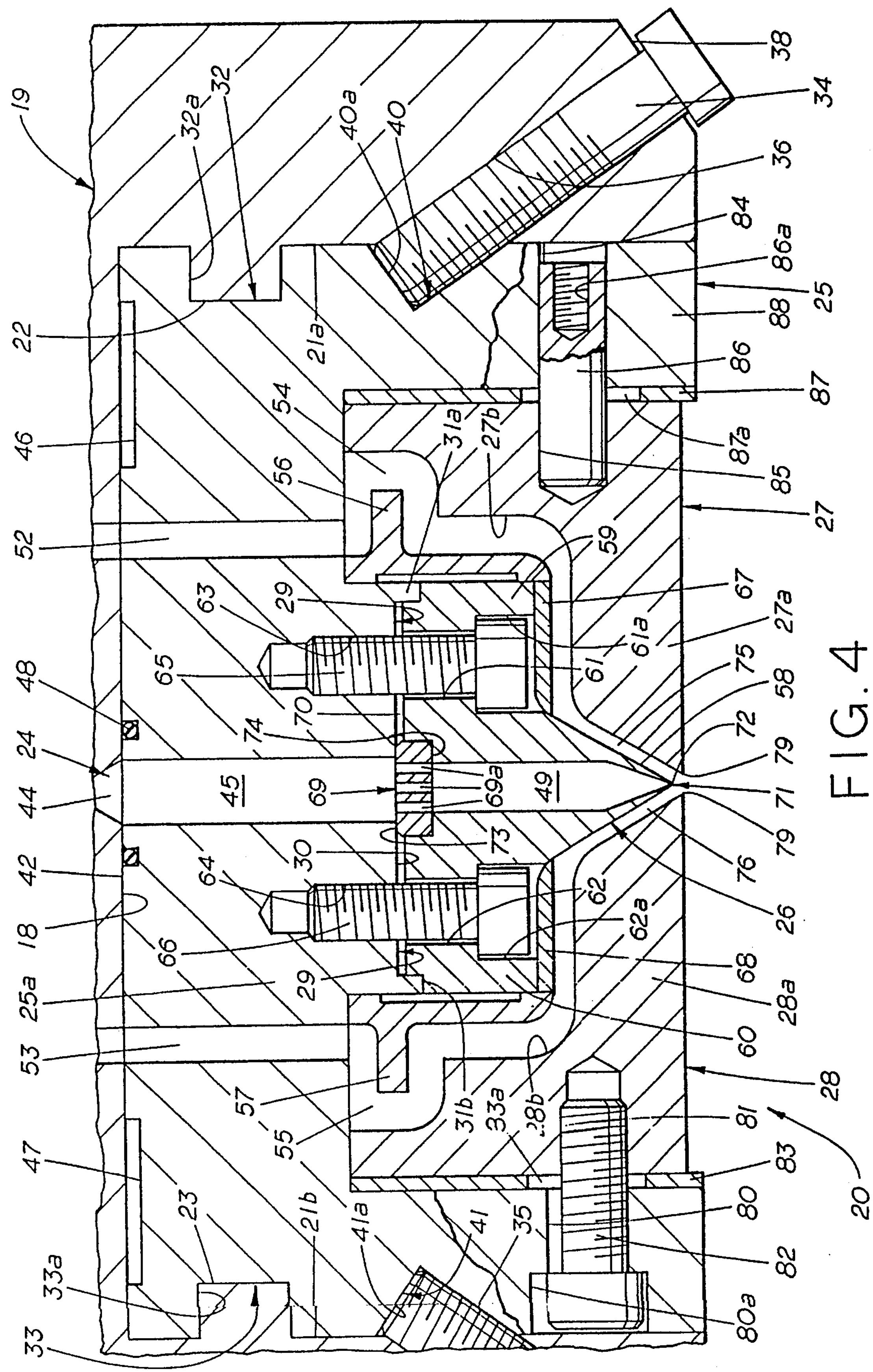
FIG. 4 is a sectional view illustrating the die tip assembly mounted in the die body.

The die body 19 and die tip assembly are separate parts as illustrated in FIGS. 2 and 3. FIG. 4 illustrates the two components assembled.

With reference to FIG. 2, the die body 19 has formed therein an elongate cavity 17 defined by downwardly facing bottom surface 18 and inwardly facing side walls 21*a* and 21*b*. Ribs 22 and 23 protrude outwardly from the walls 21*a* and 21*b*, respectively, and serve to support the die tip assembly 20 as described below. The die body 19 also has formed therein a polymer flow passage 24 discharging at bottom wall 18. The polymer flow passage 24 may be in the form of a coat hanger die as described in U.S. Pat. No 4,818,463, provided with channel 24*a* along the length of surface 18.

As shown in FIGS. 3 and 4, die tip assembly 20 comprises mounting block 25, die tip 26, and air knives or air plates 27 and 28. Mounting block 25 is preferably in the form of a U-shaped member having a groove 29 formed therein with mounting surface 30. The groove 29 is adapted to receive die tip 26 on raised mounting surfaces 31*a* and 31*b*. Grooves 32 and 33 formed in opposite sides of block 25 are sized to engage ribs 22 and 23, respectively, of the die body. The block 25 is provided with upwardly facing surface 42.

Referring to FIG. 4, the die tip assembly is sized to fit in close conformity in body cavity 17 and to move slidingly lengthwise therein, with elongate die body ribs 22 and 23 engaging assembly mounting block grooves 32 and 33, respectively. The sliding motion of assembly 20 with respect to die body 19 occurs into or out of the plane of FIG. 4. Die cavity 17 is open at both ends so that die tip assembly 20 may slide into or out of the cavity from either side of die body 19. For vertical orientation of the die body 19 (as in FIG. 1), die body ribs 22 and 23 acting upon groove surfaces 32*a* and 33*a*, respectively, are structurally sufficient to support the weight of die tip assembly 20. The present invention contemplates any orientation of the die, although the vertical orientation is preferred. The intermeshing ribs/grooves thus provide intermeshing shoulders for supporting the die tip assembly on the die body.

The die tip assembly 20 is secured to die body 19 by bolts 34 and 35 which act upon mounting block 25 to apply compressive forces. Angled holes 36 and 37 enter die body 19 through beveled surfaces 38 and 39, respectively, and threadingly receive hold down bolts 34 and 35, respectively. Holes 36 and 37 align with angled grooves 40 and 41, respectively, formed in opposite sides of mounting block 25 and extending parallel to grooves 32 and 33. Each groove terminates in flat surfaces 40*a* and 41*a*. Upon tightening of hold down bolts 34 and 35, an inward force is imparted to surfaces 40*a* and 41*a* and in reaction the surface 42 of the assembly mounting block 25 is compressed onto the confronting back wall 18 of die body cavity 17. The compressive force so exerted is sufficient to secure die tip assembly 20 to die body 19 for operation. The dimensions of grooves 32 and 33 in relation to ribs 22 and 23, respectively, are such to tolerate this action. Thus, during sliding installation or removal of the assembly 20, bolts 34 and 35 are merely loosened or withdrawn and the weight of said assembly 20 is supported on die body ribs 22 and 23, and for operation said assembly secured to the die body by the compressive action of bolts 34 and 35. As described in detail below, the compressive forces provide a fluid seal for flow passages traversing from the die body to the die tip assembly.

Grooves 40 and 41 extend the length of the assembly (see FIG. 5) and are open at both ends so that the assembly may move into or out of cavity 17 with bolts 34 and 35 loosened, but not fully withdrawn, from holes 36 and 37. In addition, the present means for securing the assembly to the die body as described avoids the problem of the securing bolts 34 and 35 passing through an air flow passage and possibly blocking and disrupting the flow therethrough. In practice there will be multiple bolts spaced over the length of the die and the number of bolts will depend on the length. To facilitate centering the die tip assembly in the die body, threaded hole 36 provided at the centerline of die body 19 aligns with tapered centering hole 43 (see FIG. 5) formed in surface 40*a* in mounting block 25 for receiving a tapered centering bolt (not shown). The bolts 34 and 35 thus serve as compression rods for applying compressive forces (e.g., by threaded connection) to secure the die tip assembly 20 to the die body 19. Equivalently hydraulic pistons can be used as compression rods to apply the compressive forces.

Die body polymer flow passage 24 is in fluid communication with elongate flow passage 45 formed in mounting block 25 such that flow passage 45 registers with flow channel 24*a* formed in die body 19.

Surfaces 42 and 18 are machined planar surfaces and are interfaced in tight compression by securing bolts 34 and 35 as has been described. The compressive force is sufficient to form a metal-on-metal fluid seal between said surfaces and establish a fluid seal around the junction of polymer flow channel 24*a* and flow passage 45. Cut-outs 46 and 47 are provided in surface 18 to decrease the contact area between surfaces 42 and 18, and thereby increase and concentrate the compressive stress in the region around the polymer flow passage junction for forming the seal. Although not essential, O-ring 48 may be provided around the junction to further accomplish the seal.

Mounting block flow passage 45 receives a polymer melt from die body channel 24*a* and conducts the polymer to flow passage 49 formed in die tip 26. Flow passage 45 may be longitudinally continuous or, for mechanical strength, may comprise an in-line series of shorter elongate passages closely spaced over the length of the mounting block. For long dies, the latter configuration is preferred to increase the structural integrity of the mounting block. The end enclosures of polymer passage 45 are formed by the side walls 77 (one shown in FIG. 1) of mounting block 25 and end enclosures of polymer passage 49 are defined by the side walls of die tip 26 in the conventional manner.

Air flow passages 51 formed on opposite sides of die body 19 register with air passages 52 and 53, respectively, formed in mounting block 25. The compression of assembly surface 42 onto cavity wall 18 by securing bolts 34 and 35 establishes metal-on-metal fluid seals at the junctions of the air flow passages, as has been described in relation to polymer flow passages 44 and 45.

As described below, the die tip 26 and air knives 27 and 28 define converging air channels 54 and 55. Air flow passages 52 and 53 feed assembly air flow passages 54 and 55, respectively. The air flow passages 52 and 53 are preferably in the form of a plurality of holes spaced along the length of the die to provide a uniform distribution of air along the die and register with a like number of air passages 51 in the die body 19. Air deflector plates 56 and 57 are provided to induce mixing of air discharged from the plurality of air holes 52 and 53, and thereby achieve a uniform air flow along the length of air channels 54 and 55, respectively. Deflector plates 56 and 57 may be secured to die tip flanges 59 and 60 by bolts (not shown).

The die tip assembly of the present invention preferably employs the mounting techniques disclosed in U.S. Pat. No.

4,986,743. Although this die tip mounting technique is preferred, it can be anticipated that other mounting techniques may also be used without departing from the inventive concept of the present die tip assembly invention. The disclosure of U.S. Pat. No. 4,986,743 is incorporated herein by reference.

As best seen in FIGS. 3 and 4, die tip 26 is an elongate member having a protruding triangular nose piece 58 and flanking flanges 59 and 60 which have aligned clearance holes 61 and 62, respectively. Holes 61 and 62 are counterbored at 61*a* and 62*a* at one end, and aligned with threaded mounting block holes 63 and 64, respectively, at the other end. The die tip 26 is secured to mounting block 25 by bolts 65 and 66. Cover plates 67 and 68 cover the counterbore holes and are attached to die tip flanges 59 and 60 using bolts (not shown).

Polymer flow passage 49 formed in the die tip is in fluid communication with mounting block flow passage 45 through flow distribution plate 69 (referred to as a breaker plate). The breaker plate contains a plurality of smaller holes 69*a* which serve to distribute the polymer flow uniformly over the length of the die tip flow passage 49. On one side, breaker plate 69 fits in close conformity in a die tip groove 74 and, on the opposite side, confronts the mounting block 25 along a portion of surface 30. U.S. Pat. No. 4,986,743 teaches that the dimensions of breaker plate 69 in relation to groove 74 are such that as the die tip mounting bolts 65 and 66 are tightened, metal-on-metal fluid seals are established at the interface of breaker plate 69 and confronting surface 30 on one side of the breaker plate, and the interface of breaker plate 69 and the confronting bottom surface 73 of groove 74 on the other side, thereby establishing a fluid seal at the junction of polymer flow passages 45 and 49.

Die tip nose piece 58 protrudes outwardly and terminates at apex 71 which has a plurality of side-by-side orifices 72 drilled through the apex and spaced equi-spaced therealong forming a row of orifices. The spacing of the orifices is usually between 10 to 40 orifices per inch and the orifice diameters are generally between 0.010 to 0.025 inches. A pressurized polymer melt flows through passages 44 and 45, through breaker plate 69, and into die tip passage 49. Orifices 72 are in fluid communication with polymer flow passage 49 so that a pressurized polymer melt therein is forces through the orifices and discharged as a plurality of side-by-side molten or semimolten fibers.

The internal pressure in polymer flow passage 49 tends to induce a tensile stress in the tip which concentrates at the apex of the nose piece 58 and may cause the tip to fail in tension. Mounting of the die tip in accordance with U.S. Pat. No. 4,986,743 applies a compressive stress in the apex region of the nose piece which counterbalances the tensile stress, thereby reducing the resultant operating stress in the nose piece.

In accordance with the inventive die tip disclosed in U.S. Pat. No. 4,986,743, breaker plate 69 is fully inserted in groove 74 and die tip 26 is positioned on raised shoulders 31*a* and 31*b* on the mounting block 25. The bottom surface 73 of the breaker plate 69 confronts a portion of mounting block surface 30 surrounding flow cavity 45. With the die tip 26 positioned on the shoulders 31*a* and 31*b*, but not bolted, the breaker plate surface 73 is spaced from mounting block surface 30, and die tip surface 74 is spaced from mounting block surface 30. Upon tightening bolts 65 and 66 to the fully stressed position, the die tip 26 undergoes a small inward deflection with shoulders 31*a* and 31*b* acting as fulcrums. The spacing between breaker plate surface 73 and mounting block surface 30 is reduced to zero as the surfaces are interfaced in tight compression, while the spacing 70 between surfaces 74 and 30 remains greater than zero. The compression of the breaker plate surface 73 onto the mounting block surface 30 seals polymer flow passages 45 and 49 as described above. The inward deflection of the die tip 26 induces a compressive bending moment which concentrates in the apex region of the nose piece 58. The resultant compressive stress in the apex counterbalances, in part, the tensile stress induced by internal pressure in flow passage 49 during operation.

Air knives 27 and 28 are elongate plates with inner surfaces 27*b* and 28*b*, respectively, contoured in general conformity with confronting surfaces of die tip 26 and spaced therefrom to form flanking air flow passages 54 and 55, respectively. Air knives 27 and 28 have inwardly projecting flanges 27*a* and 27*b* which terminate in spaced apart edges 79 and in combination with confronting die tip nose piece 58, form converging air flow passages 75 and 76, respectively. Air supplied on opposite sides of the die 11 via lines 13 flows through air chambers 50, through passages 51, passages 52 and 53, passages 54 and 55, and into converging air flow passages 75 and 76. The angle of convergence is defined by the internal angle of nose piece 58 and is typically between 45 to 90 degrees. Passages 75 and 76 discharge converging air sheets onto opposite sides of die tip orifices 72 to attenuate and draw down the fibers issuing therefrom and to form a fiber air stream 12.

End enclosures of air flow passages 53,54,55,56,75, and 76 are formed by end plates 77 and 78 (see FIGS. 1 and 9), which are bolted onto opposite ends of mounting block 25. End plates 77 and 78 are considered to be components of die tip assembly 20. The outer periphery of end plates 77 and 78 are sized to allow assembly 20 to be slidingly moved into or out of die body cavity 17 with the end plates attached.

The position of air knives 27 and 28 in relation to die tip 26 are adjustable vertically and horizontally for controlling the flow properties of the converging air sheets discharging from flow passages 75 and 76. The positions of the air knives 27 and 28 are determined by the air-gap, indicated by dimension E in FIG. 8, and the set-back, indicated by F. Air-gap refers to the width of air flow passages 75 and 76, and the set-back is the lateral distance between the knife edge 79 of the air knife and the die tip apex 71. Each air knife 27 and 28 will usually be positioned at the same air-gap and set-back on opposite sides of the apex. The proper air-gap and set-back settings will depend on the composition of the polymer melt being processed, the desired web properties, and the size of the die. For melt-blowing polypropylene, the air-gap is typically between 0.010 to 0.100 inches and the set-back is between −0.020 to +0.100 inches. As mentioned above and described in detail below, the present die tip assembly includes adjustable air-gap means and adjustable set-back means. More specifically, according to the invention, the air gap and set back parameters are adjusted before the die tip assembly is mounted in the cavity in the die body.

The positions of the air knives 27 and 28 are adjusted with respect to the mounting block 25 and the die tip 26 by structure referred to herein as air knife securing means, adjustable air-gap means, and adjustable set-back means. For clarity, the securing means and air-gap adjustments means are described below for air knife 28, and the set-back adjustment means is described for air knife 27. It is to be understood, however, that both air knives 27 and 28 are provided with securing means, air-gap means, and set-back means of the same design, and the description of either of there with reference to one of the air knives applies equally to both air knives.

According to one aspect of the invention, plural discrete selectible options are provided for the vertical relation of the air plates 27 and 28 to die tip 26, while the lateral position of air plates 27 and 28 is adjusted by spacer plates 83, 87 between air plates 27 and 28 and block 25. The air gap and set back parameters are functions of these relative vertical and lateral positions. Conveniently, the user is supplied with data relating the desired vertical position and spacer plate thickness to various combinations of air gap and set back parameters. The selected air gap and set back parameters can then be preset by appropriate assembly of the air plates to the mounting block, that is, before insertion of the die tip assembly into cavity 17 in die body 19.

Figure 5:
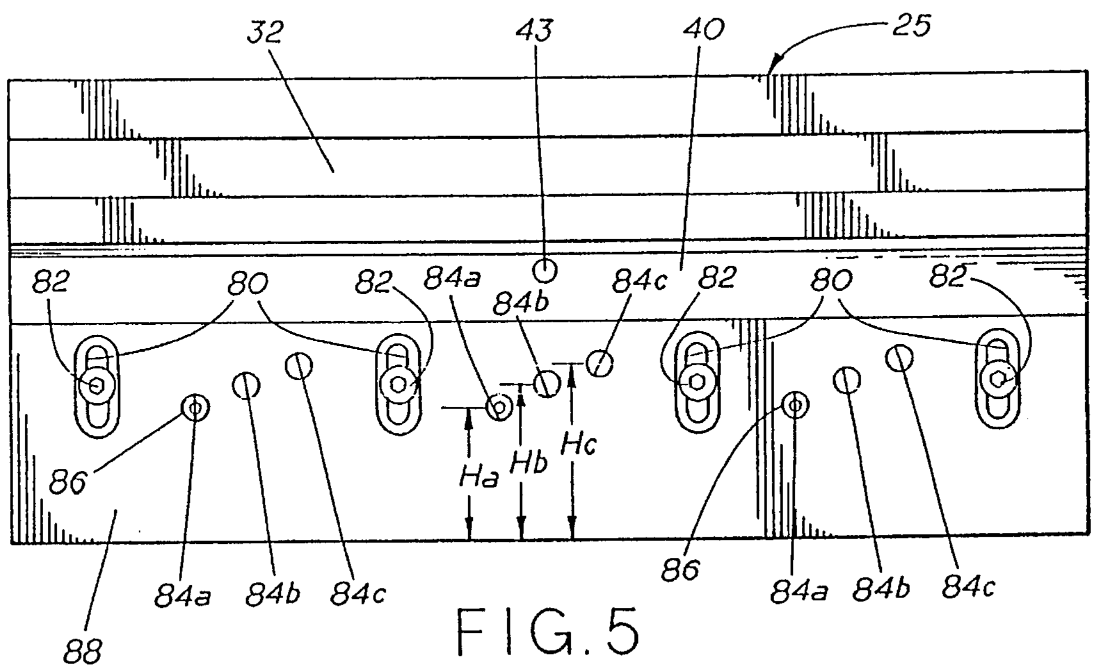
FIG. 5 is a sectional view illustrating details of the die tip assembly mounting block with the cutting plane along plane 5—5 of FIG. 3.

As shown in FIGS. 4 and 5, mounting block 25 is provided with slot 80 having counterbore 80*a* in alignment with threaded air knife hole 81 which receives air knife securing bolt 82. For clarity, the configuration is shown for air knife 28 only, however, air knife 27 is provided with securing means of the same design. Air knife 28 is secured to mounting block 25 by bolt 82, and is spaced therefrom by spacer plate 83. Counterbore 80*a* is provided so that the head of bolt 82 will not interfere with the sliding of assembly 20 into die body cavity 17, and to allow vertical adjustment of the position of air plate 28 with respect to mounting block 25. In practice there will be multiple securing bolts 82 distributed along the length of the assembly and the number of bolts will depend on the length. Spacer plate 83 is provided with aligned slot 83*a* for the passage of bolt 82 therethrough. For any particular set-back of the air knife, the thickness of the spacer plate 83 determines the air-gap between the air knife and die tip nose piece 58. Upon tightening bolts 82, the air-gap is set positively since no further adjustments are needed for operation. Spacer plates of specified thickness can be interchanged to obtain the desired air-gap and this procedure is completed prior to the installation of the die tip assembly 20 in die body 19.

The set-back means is shown in FIGS. 4 through 7 for air knife 27 only; however, in practice air knife 28 will also be provided with a set-back means of the same design. Mounting block 25 has a plurality of sets of vertically and laterally spaced dowel pin holes 84 in alignment with dowel pin holes 85 in air knife 27 for receiving dowel pin 86. See FIGS. 5–7. By inserting dowel pins 86 in appropriate ones of holes 84*a*–84*c* in block 25, the vertical position of air knife 27 is fixed with respect to block 25. Air-gap spacer plate 87 (identical to 83) is provided with an aligned slot 87*a* to permit the dowel pin to pass therethrough. The length of dowel pin 86 is such that with the dowel pin fully inserted, the pin occupies both holes 84 and 85 with one end of the pin contacting the bottom of hole 85 and the other free end of the pin does not interfere with the sliding of the assembly 20 into the die body 19. Dowel pin 86 is provided with threaded hole 86*a* for receiving a threaded pull out means for withdrawing the pin. With the dowel pin 86 installed, the air knife 27 is spaced laterally from die tip nose piece 58 at a specific set-back (dimension F in FIG. 8). Thus, upon tightening securing bolt 82, the set-back of the air knife is set; again, according to an important aspect of the invention, this procedure is accomplished before installing die tip assembly 20 in die body 19.

Figure 8:
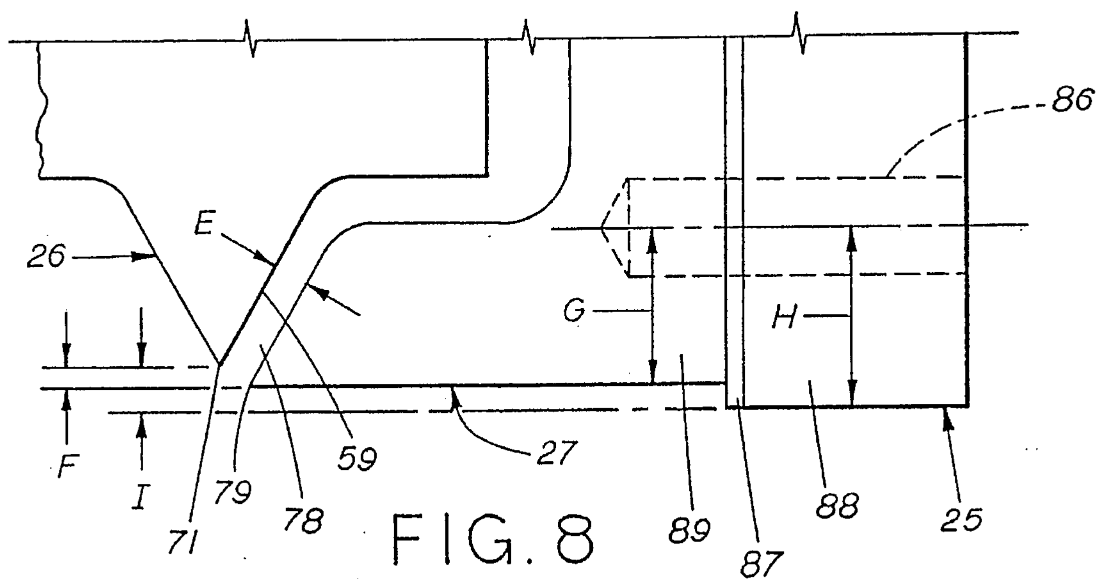
FIG. 8 is a dimensioned side view of the die tip assembly for defining the set-back.

For the purpose of describing the adjustable set-back means of the present invention, lateral dimensions G,H, and I are defined in FIG. 8 with reference to air knife 27. The set-back, F, is related to said dimensions by: F=I–H+G. For fixed values of G and I, the set-back of air knife 27 can be varied by varying the dimension H (i.e., the position of mounting block dowel pin hole 84). The present invention provides for adjustable set-back by providing air knives with dowel pin holes 85 drilled at a fixed value of dimension G, and mounting block 25 provided with a number of selectable dowel pin holes 84*a*–84*c* drilled at predetermined values of the dimension H above a reference line. The dimension I is fixed in the present invention. For setting the desired set-back, the air knife is moved vertically until air knife hole 85 in air knife 27 aligns with the desired mounting block hole 84, and the dowel pin 86 is inserted therein. Thus, dowel pin hole 84 as illustrated in FIGS. 4 and 8 is a generalization representing one of a number of selectable mounting block dowel pin holes, each hole being located at a different value of the dimension H.

Figure 6:
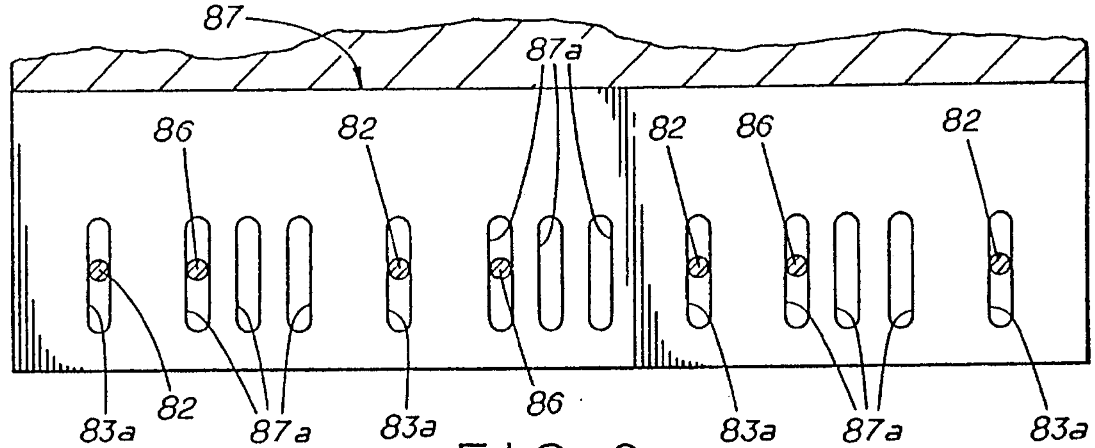
FIG. 6 is a sectional view illustrating details of the assembly spacer plate with the cutting plane along plane 6—6 of FIG. 3.
Figure 7:
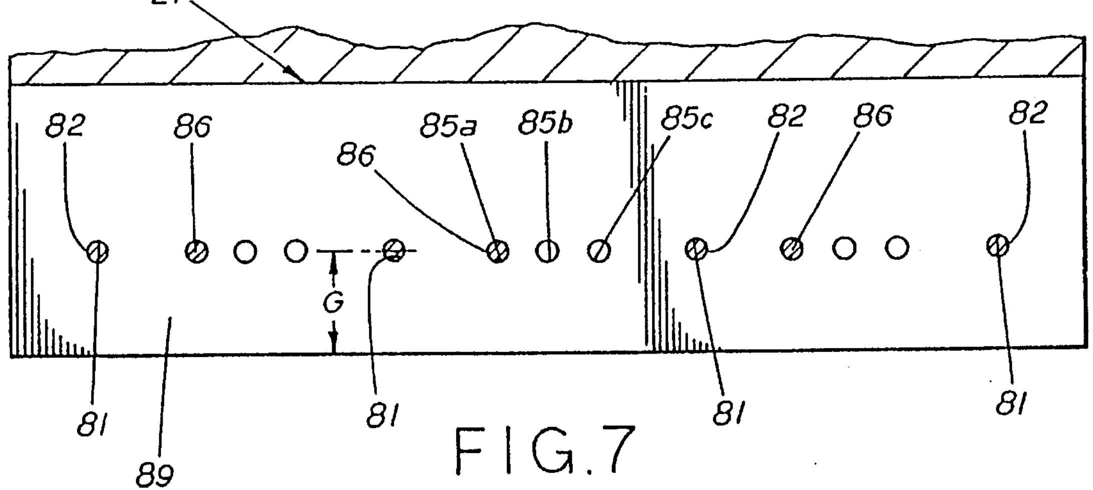
FIG. 7 is a sectional view illustrating details of the assembly air knife with the cutting plane along plane 7—7 of FIG. 3.

FIGS. 5, 6, and 7 illustrate the details of the adjustable set-back means, and the interrelationship between the mounting block 25 (FIG. 5), the spacer plate 87 (FIG. 6), and the air knife 27 (FIG. 7). The cutting plane of each Figure is indicated in FIG. 3 as planes 5—5, 6—6, and 7—7, respectively. As shown, the components are aligned longitudinally but separated laterally to illustrate the alignment of the various dowel pin holes and bolt holes for accomplishing the adjustable set-back. Mounting block 25 is provided with multiple dowel pin holes 84*a*, 84*b*, and 84*c*, which are grouped on the basis of their centerline distances Ha, Hb, and Hc, respectively, from the lower surface of mounting block 25 (note that the dimension H as defined in FIG. 8 in relation to dowel pin hole 84 is a generalization of dimensions Ha, Hb, and Hc,). The holes 84*a*–84*c* are arranged in a repeated pattern along the length of the mounting block and the number of holes will depend on the number of desired set-back positions as well as the length of the die. The holes are staggered laterally over the length of the die, as opposed to being drilled in-line vertically (i.e. along a line direction perpendicular to lower surface of block), because the vertical spacing between the groups (i.e. 25 a line e.g., Ha minus Hb) is small relative to the diameters of the holes themselves. FIGS. 5 illustrates a die tip assembly with three allowable set-back settings, each setting corresponding to a particular group of dowel pin holes.

Thus, it can be seen that a plurality of discrete vertical positions of the air plates with respect to the nose piece are defined by a plurality of sets of vertically and laterally spaced holes 84*a*–84*c* in the mounting block cooperating with a like plurality of sets of vertically aligned and laterally spaced holes 85*a*–85*c* in the air plates.

Air knife 27 has dowel pin holes 85*a*, 85*b*, and 85*c* which are grouped on the basis of their longitudinal alignment with mounting block dowel pin holes 84*a*, 84*b*, and 84*c*, respectively. The centers of air knife holes 85*a*, 85*b*, and 85*c* are arranged along a line parallel to the lower planar surface of the air knife 27 and spaced a distance G therefrom. Due to the staggered vertical positions of the mounting block dowel pin holes 84*a*–84*c*, it is not possible for more than one group of the air knife 85*a*–85*c* to be simultaneously laterally align with its respective group of mounting block holes 84*a*–84*c* over the entire length of the assembly. Thus for receiving the dowel pins 86, only one of the following combinations is possible: holes 85*a* will align with holes 84*a*, holes 85*b* will align with holes 84*b*, or holes 85*c* will align with holes 84*c*. Once a particular alignment is made and the dowel pins inserted therein, the set-back is determined. The mounting block holes and the air knife holes are drilled with low clearance for receiving the dowel pin to give good alignment over the length of the assembly. The variation in the air-gap and set-back over the die length is generally less than +0.002 inches. Although FIG. 5 illustrates a die with three set-back settings, more settings can be added in the same general way. With dowel pins 86 removed and bolts 82 loosened but still threaded into the air knife holes 81, air knife 27 can be moved vertically with bolts 82 sliding along in slots 80 (which also serves to maintain longitudinal alignment of the mounting block and air knife). In this way, the air knife can be moved until the desired group of mounting block dowel pin holes 84*a*–84*c* (corresponding to the desired set-back) aligns with its respective group of air knife holes 85*a*–85*c*, and the dowel pins 86 may then be inserted therein. Securing bolts 82 are tightened to positively set the set-back and secure the air knife for operation. Spacer plate 87 has multiple slots 83*a* and 87*a* in alignment with the bolt holes and dowel pin holes for allowing the bolts and dowel pins to pass therethrough respectively.

In FIG. 8, it can be seen that for any particular thickness of spacer plate 87, decreasing the set-back, F, will also decrease the air-gap, E, while increasing the setback increases the air-gap. Therefore, for a particular set-back, there is a unique spacer thickness which will provide the desired air-gap. For each of the allowable setback settings, the variation in air-gap with respect to the spacer plate thickness is known from the engineering design analysis and these data can be supplied to the user to permit on-site configuration of the air-gap and set-back. Notice further that the set-back position is determined completely by selection of mounting block dowel pin holes occupied by the dowel pins. This fact can be used to visually verify the set-back without the need for physical measurements.

Figure 9:
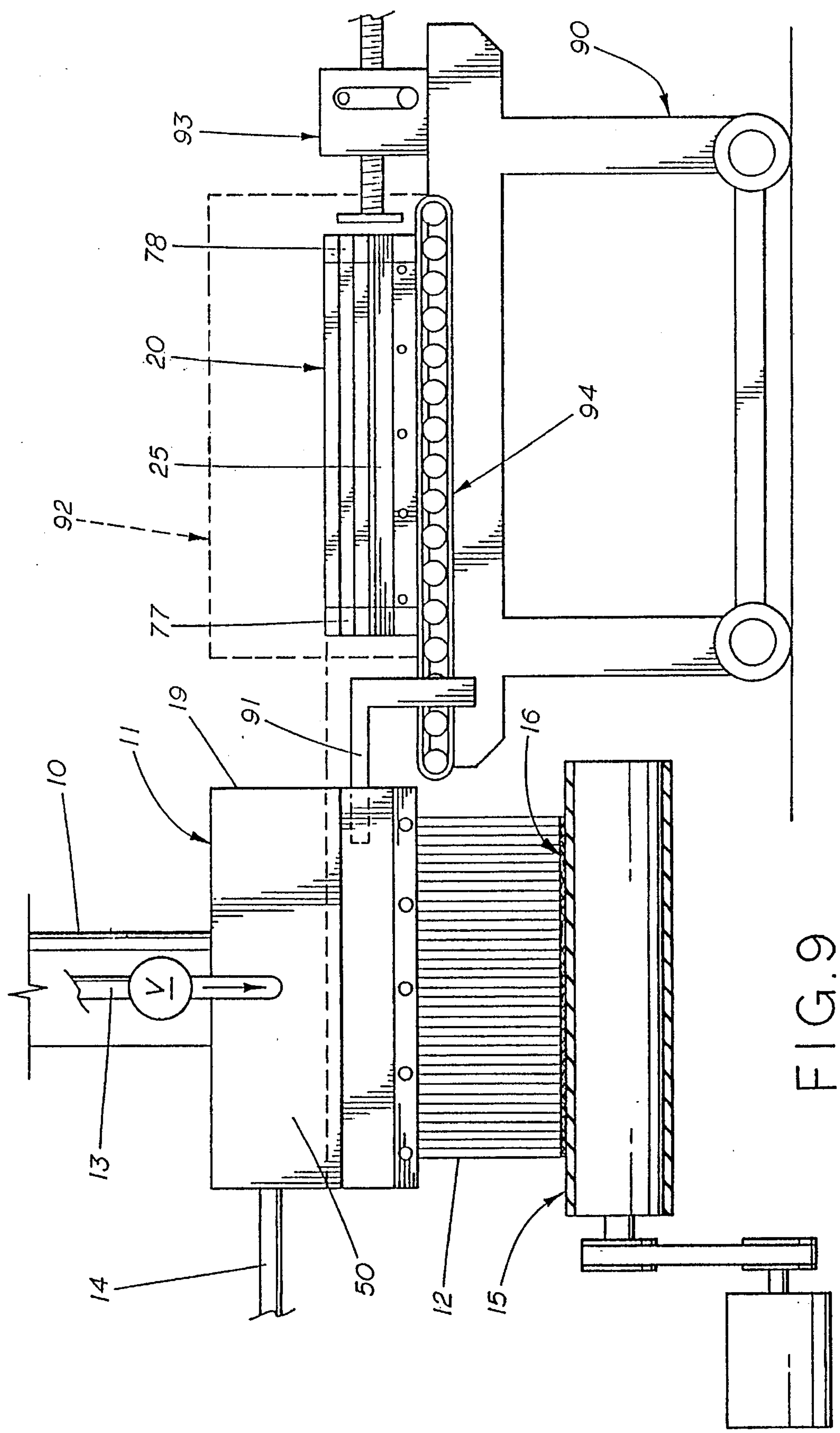
FIG. 9 is a side elevational schematic of a vertical die prepared to receive a replacement die tip assembly.

FIG. 9 illustrates a vertically oriented die body 19 prepared to receive the die tip assembly 20 of the present invention. The die tip assembly 20 will generally be preassembled on a planar work surface with the air-gap and set-back set at the desired values as has been described. The assembly will then be transported to the die body 19 for installation. To facilitate this operation, specifically designed cart 90 is anticipated as comprising aligning guide 91 for aligning the die tip assembly 20 with die body cavity 17, heating enclosure 92 (such as a furnace), ram 93, and roller surface 94. The aligning guide 91 may comprise aligning rods which mate with aligning holes drilled in the end wall of the die body 19.

For efficiently replacing a fouled or damaged assembly, the line will be momentarily shut down and bolts 34 and 35 will be loosened but, as has been described, need not be fully removed to free the old assembly. The angular orientation of beveled surfaces 38 and 39 improves the accessibility of the bolts 34 and 35. Replacement die tip assembly 20 is oriented face-down on roller surface 94, and with aligning rods 91 inserted into the die body alignment holes, die tip assembly grooves 32 and 33 are aligned for engaging die body ribs 22 and 23 as has been described. Ram 93 is employed for pushing the assembly 20 slidingly into the cavity of die body 19 and roller surface 93 facilitates delivering the assembly from the cart 90 to the die. Heating enclosure 92 may comprise a gas or electric furnace and is provided for preheating the assembly 20 for direct insertion into a hot die. For slidingly displacing the old assembly through the opposite end of the die cavity as has been described, a similar cart 90 would be placed on the opposite side of the die 11 for receiving the displaced assembly. The new die tip assembly is then secured to the die body to form a fluid seal therebetween as has been described. The line will be restarted and production resumed. To further simplify the replacement procedure, bolts 34 and 35 may be replaced with quick release connectors such as hydraulically activated pistons. The pistons can be deactivated simultaneously to free the old assembly and reactivated simultaneously for securing the new assembly to the body and for forming the fluid seals.

A problem in the replacement procedure may arise due to the dribbling of molten polymer from die body flow passage 24 after the line has been shut down. Any residual material which lodges between sealing surfaces 42 and 18 will resist the compression of said surfaces upon tightening of bolts 34 and 35, and may result in a failure to establish a seal therebetween. Therefore, as a replacement assembly slides into position, it is undesirable for any polymer dribbling from die body 44 to flow into the space separating surfaces 42 and 18. Referring to FIG. 4, it is seen that with the assembly grooves 32 and 33 engaging ribs 22 and 23, respectively, elongate assembly polymer flow passage 45 registers closely with body passage 44 even with securing bolts 34 and 35 disengaged. Therefore, as the assembly slides into position, the inserted portion of passage 45 is in general alignment with polymer flow passage 44, so that substantially any polymer dribbling from passage 44 will flow into passage 45, and will not be collected on the mating surfaces, that is, between assembly surface 42 and the die cavity surface 18. Experience has shown that small amount of polymer dribbling into passage 45 is acceptable when executing normal assembly replacement procedure.

As described above, the die assembly constructed according to the present invention permits the rapid and efficient replacement of a die tip. This results in a new and improved method of replacing a die tip while the assembly is at or near operating temperature. The method comprises the steps of:

(a) extruding a molten polymer through the orifices of the die tip at a meltblowing operating temperature;

(b) adjusting a replacement die tip to provide described air gap and set back values;

(c) preheating the replacement die tip substantially about the same temperature (e.g., within 10 degrees Fahrenheit) to the die tip in the die assembly;

(d) discontinuing the extrusion of the molten polymer;

(e) moving the die tip out of the die assembly; and (f) moving the replacement die tip into the die assembly whereby the thermal expansion resulting from the preheating step of the replacement die tip is about the same as that of the die tip replaced.

The method may be carried out at elevated temperatures (e.g. 400 degrees Fahrenheit and above) without waiting for the die to cool down to room temperature. Even at 250 degrees Fahrenheit thermal expansion resulting from inserting a die tip at room temperature could present problems. The problem of thermal expansion, however, is more serious at 350 degrees Fahrenheit and above. It is preferred to preheat the die to within fifty degrees, and preferably 25 degrees of the operation temperature. It is also preferred to replace the die before it has cooled more than 50 degrees Fahrenheit.

In a preferred method, the die tip is replaced while maintaining the die assembly at operating temperature (e.g., the die heaters 14 are not shut off during die tip replacement).

Thermoplastic materials suitable for the process of the invention include any thermoplastic useable in meltblowing. These include polyolefins including homopolymers, copolymers (e.g., EVA), terpolymers, etc. Other suitable materials include polyesters such as poly(methylmethacrylate) and poly(ethylene terephthate); polyamides such as poly(hexamethylene adipamide), and poly(omega-caproamide), and poly(hexamethylene sebacamide); polyvinyls such as polystyrene. Other polymers may also be used, such as nylon, polytrifluorochloroethylene, polyurethanes, polycarbonates, silicones, pitch, and blends thereof. The polyolefins are preferred. These include homopolymers and copolymers of the families of polypropylenes, polyethylenes, and other high polyolefins. The polyethylenes include LDPE, HDPE, LLDPE, and very low density polyethylene.

A broad range of process conditions may be used according to the process of the invention depending upon the thermoplastic material chosen and the type of web/product properties needed. Any operating temperature of the thermoplastic material is acceptable so long as the material is extruded from the die so as to form a nonwoven product. An acceptable range temperature for the thermoplastic material in the die, and consequently the approximate temperature of the die head around the material, is 350 degrees Fahrenheit to 900 degrees Fahrenheit. A preferred range is 400 degrees Fahrenheit to 750 degrees Fahrenheit. For polypropylene, a highly preferred range is 400 degrees Fahrenheit to 650 degrees Fahrenheit.

Any operating temperature of the air in the air knife is acceptable so long as it permits production of useable nonwoven product. An acceptable range is 350 degrees Fahrenheit to 900 degrees Fahrenheit.

The flow rates of thermoplastic and air may vary greatly depending on the thermoplastic material extruded, the distance of the extrusion head from the take-up device, and the temperatures employed. An acceptable range of the ratio of pounds of air to pounds of polymer is about 20–500, more commonly 30–100 for polypropylene. Typical polymer flow rates vary from about 0.3–1.5 grams/hole/minute, preferably about 0.5–1.0.

What is claimed is:

1. A die assembly for meltblowing polymer product, comprising:

(a) an elongated die body having a central coathanger-shaped polymer flow passage and a pair of air passages formed therein, said air passages being disposed on either side of said polymer flow passage, and comprising heating means disposed so as to liquefy polymer material flowing in said polymer flow passages;

(b) an elongate mounting block adapted to be removably mounted to a lower surface of said die body and having polymer and air passages therein located so as to mate with the polymer and air passages in said die body when said mounting block is mounted to said die body;

(c) a die tip adapted to be removably mounted to a lower surface of the mounting block, and having a downwardly converging elongate nosepiece of triangular cross section terminating in an apex, a row of orifices being formed along the apex and mating with said polymer passage in said mounting block;

(d) first and second air plates for being secured to the mounting block on opposite sides of the nosepiece of the die tip, said air plates being adapted to be secured to the mounting block in a desired vertical position with respect to said nosepiece and being laterally spaced therefrom by a desired lateral spacing, and thereby defining converging air passages mating with said opposed air passages in said mounting block;

(e) means for selectably defining the position of the air plates with respect to the mounting block, said means for selectably defining comprising:

(i) means defining the lateral spacing of the air plates from the nosepiece, and (ii) means defining the vertical position of the air plates with respect to the nosepiece, whereby independent adjustment of the lateral spacing and vertical position of the air plates with respect to the apex of the nosepiece is effected upon the securing of the air plates to the mounting block; and (f) means for clamping the mounting block, having had the die tip and air plates secured thereto, to the die body, said means for clamping being releasable to permit the mounting block with the die tip and air plates secured thereto to be fixed to the die body and be removed therefrom.

2. The die assembly of claim 1, wherein said die body has a cavity formed therein for receiving said mounting block, and said cavity in said die body and said mounting block define mating shoulders and grooves formed in confronting surfaces thereof, whereby said mounting block may be supported within said cavity in said die body as said mounting block is slid into said cavity from one end thereof.

3. The die assembly of claim 1, wherein the lower surface of said mounting block includes a recess, said recess receiving said die tip and first and second air plates, said means defining the lateral spacing of the air plates from the nosepiece and said means defining the vertical position of the air plates with respect to the nosepiece comprising means defining several selectable discrete vertical positions of the air plates with respect to the apex of the nosepiece, and spacer members disposed between confronting vertical surfaces of said air plates and said recess formed in said mounting block for determining the lateral positions of the air plates with respect to the nosepiece.

4. The die assembly of claim 3, wherein the confronting vertical surfaces of said recess define opposed walls, and said means defining several selectable discrete vertical positions of the air plates with respect to the apex of the nosepiece comprises a plurality of dowel pins, one end of each of said dowel pins being received in one of a plurality of sets of vertically and laterally spaced dowel pin receiving holes formed in either of each of opposed walls of said recess, said walls extending vertically upwardly from a lower surface of said mounting block, or in each of said air plates, and an opposite end of each of said dowel pins being received in one of a plurality of sets of horizontally aligned and laterally spaced dowel pin receiving holes formed in the other of each of said opposed walls of said recess in said mounting block and each of said air plates, and wherein said selectable spacer members are received between each of said air plates and the opposed walls of said recess, and have apertures formed therein to allow said dowel pins to pass therethrough.

5. The die assembly of claim 1, wherein said means for clamping the mounting block to the die body comprises a plurality of compression rods spaced along the length of the die body, and adapted to urge the mounting block into engagement with the die body.

6. The die assembly of claim 5, wherein said compression rods comprise threaded members threadingly engaging the die body.

7. A meltblowing die assembly comprising a die body and an assembly of an elongate mounting block, an elongate die tip and first and second air plates, said assembly being removably mounted to said die body, wherein:

(a) said die body including a coathanger-shaped polymer flow passage formed therein and having heating means assembled thereto to heat polymer in said polymer flow passage, said die body having a bottom surface for having assembled thereto said mounting block, and said die body further having air flow passages formed therein, said air flow passages and polymer flow passage discharging through the bottom surface;

(b) said elongate mounting block being substantially coextensive with the bottom surface of said die body and having (i) outwardly facing side walls and an upwardly facing surface, (ii) a downwardly facing surface, (iii) at least one polymer flow passage in said mounting block extending from the upwardly facing surface to the downwardly facing surface, the mounting block being adapted to be assembled to the die body with the upwardly facing surface of the mounting block contacting the bottom surface of the die body such that said polymer flow passages in said die body and mounting block are in fluid communication; and (iv) an elongate cavity formed in said downwardly facing surface of said mounting block receiving said first and second air plates and said elongate die tip;

(c) said elongate die tip having an upwardly facing base surface adapted to be assembled to said mounting block within said cavity, and a downwardly converging nosepiece of triangular cross-section terminating in an apex, a row of orifices extending through said nosepiece being formed along the apex, and a polymer flow passage extending from the base surface to the orifices, said polymer flow passage in said die tip being in communication with said polymer flow passage in said mounting block when said die tip is assembled to said mounting block, (d) said first and second air plates being mounted to the mounting block within said cavity on opposite sides of the nosepiece of the die tip and spaced from said nosepiece, thus defining converging air passages between said air plates and said nosepiece, whereby an air gap is defined between said air plates and said nosepiece, and whereby a setback of said air plates is defined with respect to said nosepiece, and wherein said converging air passages communicate with said air passages in said die body;

(e) means for securing the air plates to the mounting block within the cavity, said means for securing comprising means for adjusting the relative positions of the air plates with respect to the nosepiece of the die tip, said means for adjusting comprising (A) first and second planar spacers adapted to be disposed between confronting vertical planar surfaces of said first and second air plates and the mounting block, defining the relative positions of said air plates with respect to said nosepiece in a first dimension, and (B) means for defining a plurality of selectable discrete positions at which said air plates may be fixed with respect to said nosepiece, thus defining the relative positions of said air plates with respect to said nosepiece in a second dimension orthogonal to said first dimension, said means for adjusting thus permitting independent adjustment of the air gap defined by each of the air passages and the setback between the air plates and the apex of the nosepiece upon the securing of the air plates to the assembly of the die tip and mounting block; and (f) means for securing the mounting block to the die body with the die tip mounted on the mounting block, and with said first and second air plates secured to the mounting block, and with the polymer flow passages of the die body and mounting block in fluid communication, wherein the means for securing the mounting block to the die body is adapted to permit the mounting block to be secured to or be removed from the die body without disturbing the adjustment of the air plates with respect to the nosepiece.

8. The die assembly of claim 7, wherein said die body has a cavity formed therein for receiving said mounting block, said cavity and said mounting block having mating shoulders and grooves formed in confronting surfaces thereof, whereby said mounting block may be supported within said cavity in said die body as said mounting block is slid into said cavity from one end thereof.

9. The die assembly of claim 7, wherein said means defining a plurality of selectable discrete positions at which said air plates may be fixed with respect to said nosepiece comprises a plurality of dowel pins, one end of each of said dowel pins being received in a plurality of sets of vertically and laterally spaced dowel pin receiving holes formed in one of said confronting planar surfaces of said mounting block and of said air plates, and a second end of each of said dowel pins being received in a plurality of sets of vertically aligned and laterally spaced dowel pin receiving holes formed in the other of said confronting surfaces of said assembly of the mounting block and of said air plates, said planar spacers having apertures formed therein to allow passage of said dowel pins therethrough.

10. The die assembly of claim 7, wherein said means for securing the mounting block to the die body comprises a plurality of compression rods spaced along the length of the die body, and adapted to urge the mounting block into engagement with the die body.

11. The die assembly of claim 10, wherein said compression rods comprise threaded members threadingly engaging the die body.

12. The die assembly of claim 7, wherein said mounting block includes air passages mating with said air flow passages formed in said die body for supply of air to said converging air passages on either side of said nosepiece.

* * * * *